(12) United States Patent
Ha et al.

(10) Patent No.: US 10,778,768 B2
(45) Date of Patent: Sep. 15, 2020

(54) METHOD AND SYSTEM FOR OPTIMIZING CLOUD STORAGE SERVICES

(71) Applicant: Electronics and Telecommunications Research Institute, Daejeon (KR)

(72) Inventors: Suwook Ha, Daejeon (KR); Kangchan Lee, Daejeon (KR); Seung Yun Lee, Daejeon (KR); Min Kyo In, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/942,792

(22) Filed: Apr. 2, 2018

(65) Prior Publication Data

US 2019/0045010 A1 Feb. 7, 2019

(30) Foreign Application Priority Data

Aug. 2, 2017 (KR) .......................... 10-2017-0098116
Oct. 11, 2017 (KR) .......................... 10-2017-0131557

(51) Int. Cl.
| | | |
|---|---|---|
| *H04L 29/08* | (2006.01) | |
| *H04L 12/24* | (2006.01) | |
| *G06F 9/455* | (2018.01) | |
| *G06F 3/06* | (2006.01) | |
| *G06F 21/60* | (2013.01) | |

(52) U.S. Cl.
CPC ........ *H04L 67/1097* (2013.01); *G06F 3/0605* (2013.01); *G06F 3/067* (2013.01); *G06F 3/0664* (2013.01); *G06F 9/45533* (2013.01); *G06F 21/604* (2013.01); *H04L 41/0823* (2013.01);
(Continued)

(58) Field of Classification Search
CPC ............ H04L 67/1097; H04L 67/1095; H04L 41/0823; H04L 41/5019; G06F 21/604; G06F 3/067; G06F 3/0664; G06F 3/0605; G06F 9/45533; G06F 2221/2111
See application file for complete search history.

(56) References Cited

U.S. PATENT DOCUMENTS

| | | |
|---|---|---|
| 9,086,897 B2 | 7/2015 | Oh et al. |
| 2013/0007737 A1 | 1/2013 | Oh et al. |

(Continued)

FOREIGN PATENT DOCUMENTS

| | | |
|---|---|---|
| KR | 10-2016-0064128 | 6/2016 |
| WO | 2015/039028 | 3/2015 |

OTHER PUBLICATIONS

Tobias Wüchner et al., "Compliance-preserving Cloud Storage Federation based on Data-driven Usage Control"; Cloud Computing Technology and Science (CloudCom), 2013 IEEE 5th International Conference; Dec. 2-5, 2013.

*Primary Examiner* — Austin J Moreau
(74) *Attorney, Agent, or Firm* — Kile Park Reed & Houtteman PLLC

(57) ABSTRACT

Provided are a method and an apparatus for optimizing cloud storage services. A method of optimizing cloud storage services includes registering a plurality of cloud storage services; acquiring information associated with the plurality of cloud storage services; performing optimization based on the acquired information; and generating a virtual storage that combines the plurality of cloud storage services through the optimization.

10 Claims, 9 Drawing Sheets

(52) U.S. Cl.
CPC .. *H04L 67/1095* (2013.01); *G06F 2221/2111* (2013.01); *H04L 41/5019* (2013.01)

(56) References Cited

U.S. PATENT DOCUMENTS

| | | | |
|---|---|---|---|
| 2014/0278807 A1* | 9/2014 | Bohacek | G06Q 30/0206 |
| | | | 705/7.35 |
| 2014/0279201 A1* | 9/2014 | Iyoob | G06Q 30/0631 |
| | | | 705/26.7 |
| 2014/0280961 A1* | 9/2014 | Martinez | H04L 41/5054 |
| | | | 709/226 |
| 2014/0281692 A1* | 9/2014 | Paleologu | G06F 11/2056 |
| | | | 714/6.32 |
| 2015/0244595 A1* | 8/2015 | Oberlin | H04L 41/5025 |
| | | | 709/224 |
| 2018/0060154 A1* | 3/2018 | Chella | G06F 11/34 |

* cited by examiner

METHOD AND SYSTEM FOR OPTIMIZING CLOUD STORAGE SERVICES

CROSS-REFERENCE TO RELATED APPLICATION(S)

This application claims the priority benefit of Korean Patent Application No. 10-2017-0098116 filed on Aug. 2, 2017 and Korean Patent Application No. 10-2017-0131557 filed on Oct. 11, 2017 in the Korean Intellectual Property Office, the disclosures of which are incorporated herein by reference for all purposes.

BACKGROUND

1. Field

At least one example embodiment relates to a method and apparatus for optimizing cloud storage services.

2. Description of Related Art

With the spread of a cloud service, cloud service providers also provide a cloud storage service as the most simple and general cloud service.

Accordingly, users using the cloud service may simultaneously use various types of cloud storage services through a single local computer. However, due to a different interface, service policy, etc., between cloud storages, users use each cloud storage service by designating a separate usage for each cloud storage service or selectively use only a frequently using service.

To outperform the above issues, cloud storage sharing methods that may virtualize a plurality of individual cloud storages into a single storage and thereby use the virtualized single storage are being developed.

SUMMARY

According to an aspect of example embodiments, there is provided an optimization method including registering a plurality of cloud storage services; acquiring information associated with the plurality of cloud storage services; performing optimization based on the acquired information; and generating a virtual storage that combines the plurality of cloud storage services through the optimization.

The performing of the optimization may include performing the optimization in response to an optimization rule selected by a user.

The optimization rule may include a plurality of mutually dependent environment setting values.

The plurality of environment setting values may include at least one of a storage size, a data stability, a storage reaction speed, and a mobility of a use environment.

The acquiring may include acquiring the information by performing a performance test on the plurality of cloud storage services.

The information may include a data write speed and a data read speed of each of the plurality of cloud storage services.

The generating of the virtual storage may include generating the virtual storage based on at least one of user's access geo-location, storage mirroring, storage stripping, and storage prioritization According to an aspect of example embodiments, there is provided a non-transitory computer-readable recording medium storing a program to implement the optimization method.

According to an aspect of example embodiments, there is provided an optimization apparatus including an access right manager configured to register a plurality of cloud storage services; a performance monitor configured to acquire information associated with the plurality of cloud storage services; an optimization rule manager configured to perform optimization based on the acquired information; and a virtual storage generator configured to generate a virtual storage that combines the plurality of cloud storage services through the optimization.

The optimization rule manager may include an optimization rule storage configured to provide an optimization rule to a user and to receive a selection of the user; and a virtual storage constructor configured to perform the optimization in response to the selection.

The optimization rule may include a plurality of mutually dependent environment setting values.

The plurality of environment setting values may include at least one of a storage size, a data stability, a storage reaction speed, and a mobility of a use environment.

The performance monitor may be configured to acquire the information by performing a performance test on the plurality of cloud storage services.

The information may include a data write speed and a data read speed of each of the plurality of cloud storage services.

The virtual storage generator may be configured to generate the virtual storage based on at least one of user's access geo-location, storage mirroring, storage stripping, and storage prioritization.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
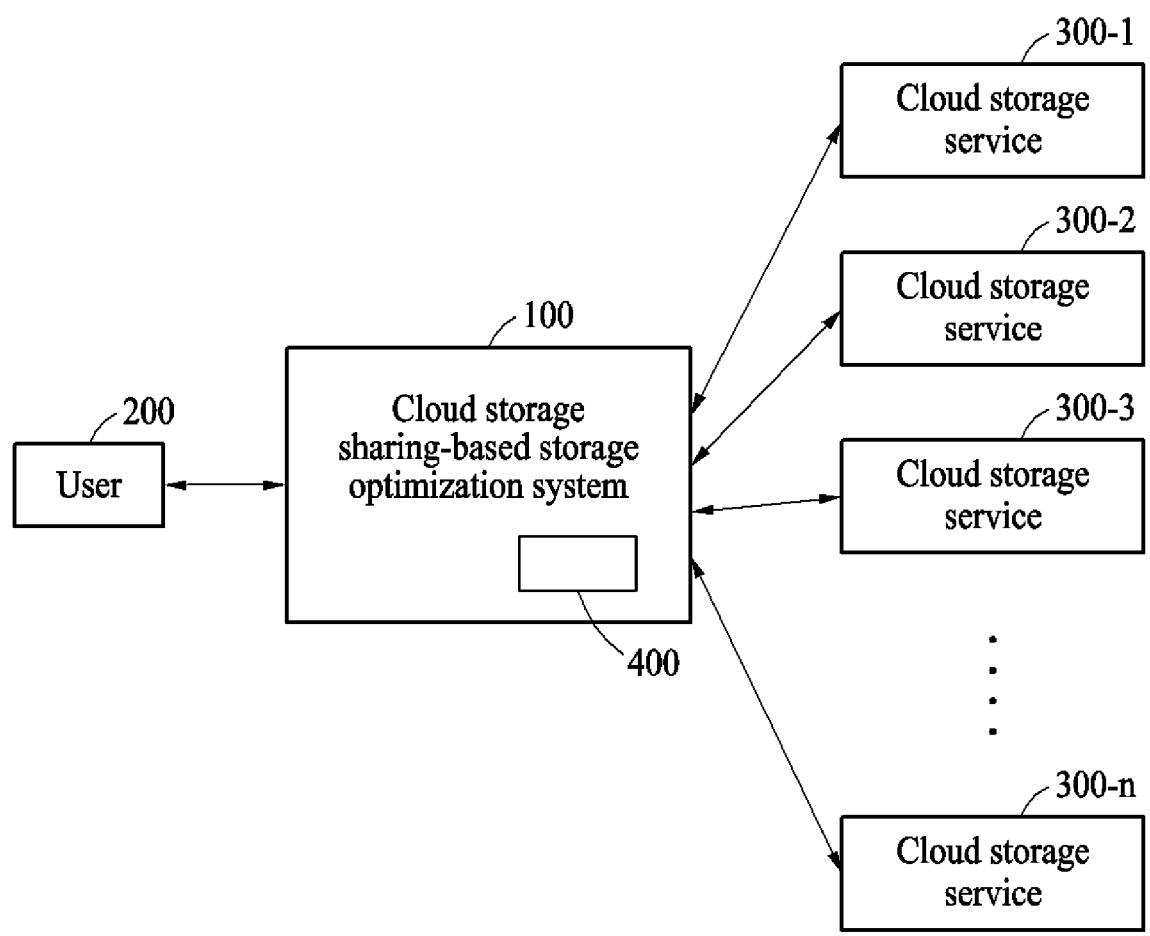
FIG. 1 is a diagram describing an operation of a cloud storage sharing-based storage optimization system according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments applied to a mobile communication network will be described. It is provided as an example only and the example embodiments may be applicable to various networks.

FIG. 1 is a diagram illustrating an operation of a cloud storage sharing-based storage optimization system according to an example embodiment.

Referring to FIG. 1, a user 200 may register a plurality of using cloud storage services 300-1, 300-2, 300-3, ..., 300-*n* (300-1 to 300-*n*) to a cloud storage sharing-based storage optimization system 100. Also, the user 200 may select an optimization rule through the cloud storage sharing-based storage optimization system 100.

Accordingly, the cloud storage sharing-based storage optimization system 100 may generate a virtual storage 400 through a combination of the optimization rule selected by the user 200 and the plurality of cloud storage services 300-1 to 300-*n* registered by the user 200 and may provide the virtual storage 400 to the user 200 in a single storage form.

Hereinafter, a function and a processing procedure of the cloud storage sharing-based storage optimization system 100, a configuration of information, and example embodiments will be described with reference to the accompanying drawings.

Figure 2:
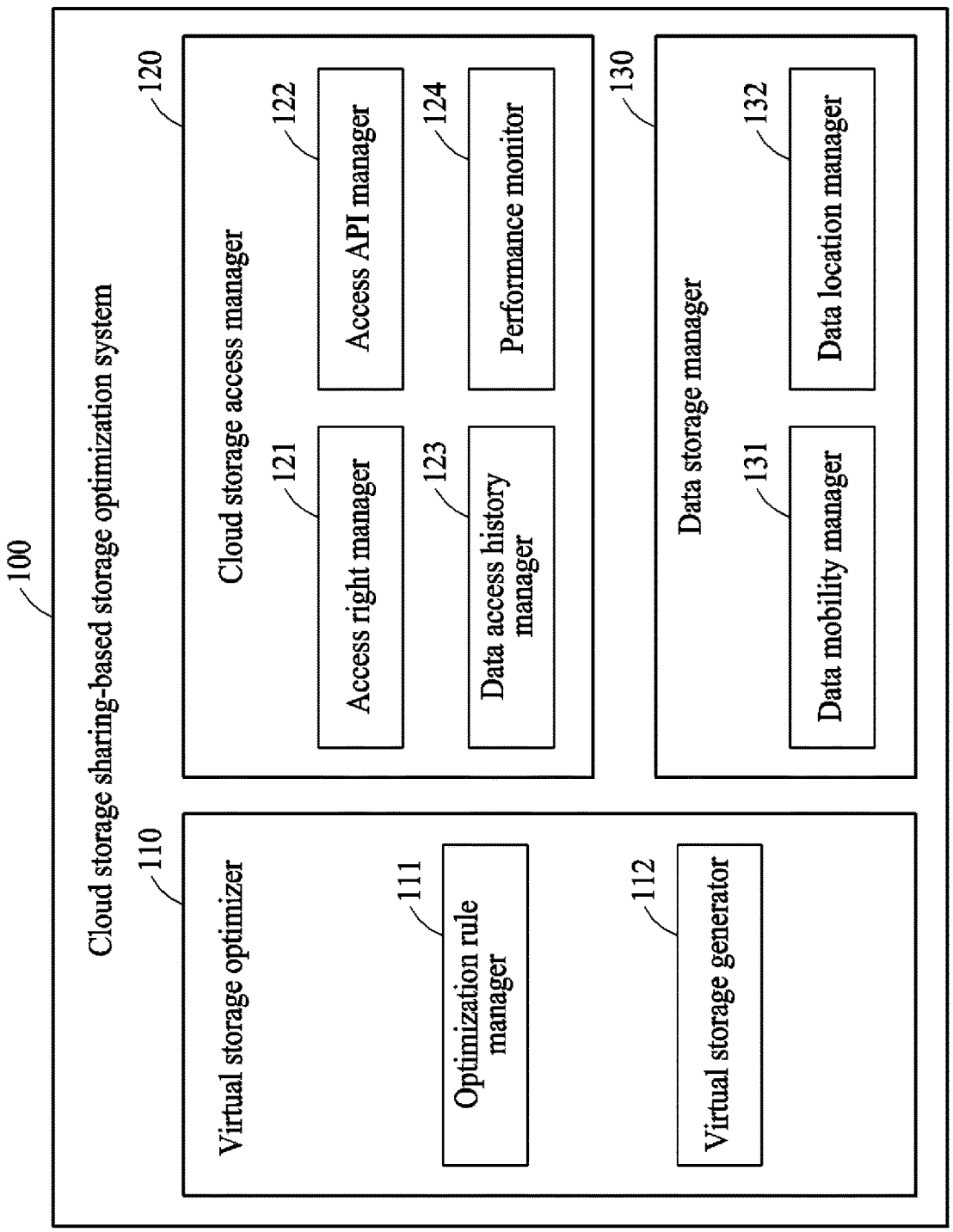
FIG. 2 is a block diagram illustrating a configuration of the cloud storage sharing-based storage optimization system of FIG. 1.
Figure 3:
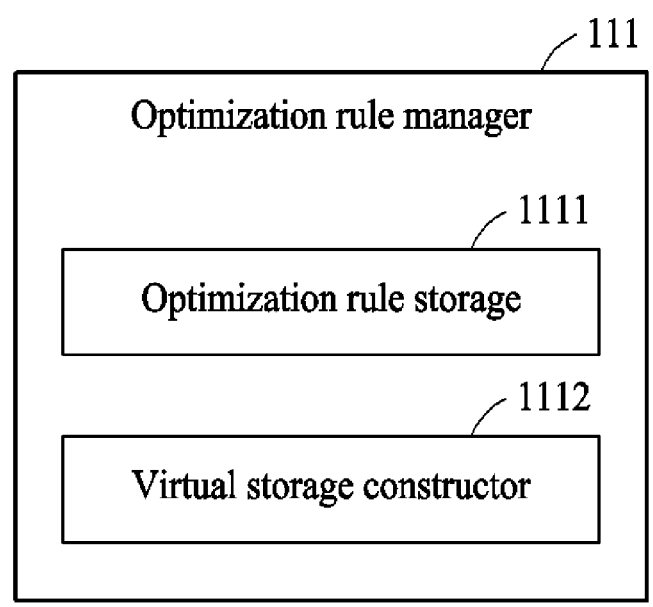
FIG. 3 is a block diagram illustrating a configuration of a virtual storage optimizer of FIG. 2.

FIG. 2 is a block diagram illustrating a configuration of the cloud storage sharing-based storage optimization system 100 of FIG. 2, and FIG. 3 is a block diagram illustrating a virtual storage optimizer of FIG. 2.

Referring to FIGS. 2 and 3, the cloud storage sharing-based storage optimization system 100 includes a virtual storage optimizer 110, a cloud storage access manager 120, and a data storage manager 130.

The virtual storage optimizer 110 may generate the optimized virtual storage 400 based on requirements of the user 200. The virtual storage optimizer 110 may include an optimization rule manager 111 and a virtual storage generator 112.

The optimization rule manager 111 may generate an environment setting value, for example, configuration information, for generating the single virtual storage 400 from the plurality of cloud storage services 300-1 to 300-*n*. For example, the optimization rule manager 111 may generate an environment setting value of the single virtual storage 400 based on service priority of the user 200. The single virtual storage 400 may refer to the unified virtual storage 400. Here, the service priority may include a performance, a stability, a mobility, and the like. The environment setting value may include at least one of a storage size, a data stability, a storage reaction speed, and a mobility of a use environment.

Also, the optimization rule manager 111 may store performance information associated with storage services that are provided from providers of the plurality of cloud storage services 300-1 to 300-*n*. Accordingly, the optimization rule manager 111 may perform an optimization operation based on the stored performance information and may generate configuration information of the single virtual storage 400. The optimization rule manager 111 may transfer the generated configuration information to the virtual storage generator 112.

Referring to FIG. 3, the optimization rule manager 111 may include an optimization rule storage 1111 and a virtual storage constructor 1112.

The optimization rule storage 111 may store an optimization rule. For example, the optimization rule may include a rule that considers a storage stability such as a data stability, a storage performance enhancement, a user location variability such as a mobility of a use environment, and the like. The user 200 may select at least one rule from among optimization rules. Here, the optimization rule may be defined based on the environment setting value selected by the user 200. That is, the optimization rule may be associated with the aforementioned environment setting value. The optimization rule manager 111 may perform the optimization operation based on the optimization rule selected by the user 200.

The virtual storage constructor 1112 may generate configuration information of the single virtual storage 400 based on the optimization rule selected by the user 200 and information associated with an available cloud storage service among the plurality of cloud storage services 300-1 to 300-n.

The virtual storage generator 112 may generate the virtual storage 400 based on the generated configuration information of the single virtual storage 400. For example, the virtual storage generator 112 may generate the virtual storage 400 based on at least one of user's access geo-location, storage mirroring, storage stripping, and storage prioritization.

User's access geo-location may refer to a mobility of a use environment such as a location variability of the user 200. Storage mirroring may refer to a data mirroring operation of duplicating and thereby storing data. Storage stripping may refer to binding operation that combines plurality of storages. Total storage capacity of the single virtual storage 400 may be enlarged by the storage stripping. Storage prioritization may refer to the order in which the data is preferentially stored.

The cloud storage access manager 120 may access the plurality of cloud storage services 300-1 to 300-n that is registered by the user 200 to the cloud storage sharing-based storage optimization system 100, and may perform monitoring. The cloud storage access manager 120 may include an access right manager 121, an access application program interface (API) manager 122, a data access history manager 123, and a performance monitor 124.

The access right manager 121 may manage user right and authentication information regarding one of the cloud storage services 300-1 to 300-n registered by the user 200 to the cloud storage sharing-based storage optimization system 100. Here, the user right information may include cloud SLA (Service Level Agreement) information between the user 200 and the providers of the plurality of cloud storage services 300-1 to 300-n. For example, the user right information may include a storage use period and cost, a data storage, a call speed, and the like. The authentication information may include an authentication element, such as an authentication method, of the user 200, an access right, and a processing allowed operation, and the like, with respect to an individual cloud storage service, for example, one of the cloud storage services 300-1 to 300-n.

The access API manager 122 may manage an access API of each of the cloud storage services 300-1 to 300-n provided from the providers of the plurality of cloud storage services 300-1 to 300-n.

The data access history manager 123 may monitor an access history on user data that is stored in an individual cloud storage service, for example, one of the cloud storage services 300-1 to 300-n provided from the providers of the plurality of cloud storage services 300-1 to 300-n.

The performance monitor 124 may evaluate a performance of each of the cloud storage services 300-1 to 300-n and may generate performance information thereof. The performance information may include a data write speed, a data read speed, and the like. Also, the performance monitor 124 may monitor the performance information.

The data storage manager 130 may store data of the cloud storage sharing-based storage optimization system 100. Also, the data storage manager 130 may move data between the plurality of cloud storage services 300-1 to 300-n for optimization.

The data storage manager 130 may include a data mobility manager 131 and a data location manager 132.

The data mobility manager 131 may process data requested by the user 200. For example, the data mobility manager 131 may store, call, move, or delete data.

The data location manager 132 may verify data stored in the single virtual storage 400 and data stored in the plurality of cloud storage services 300-1 to 300-n. For example, the data location manager 132 may refer to location information of such data.

Figure 4:
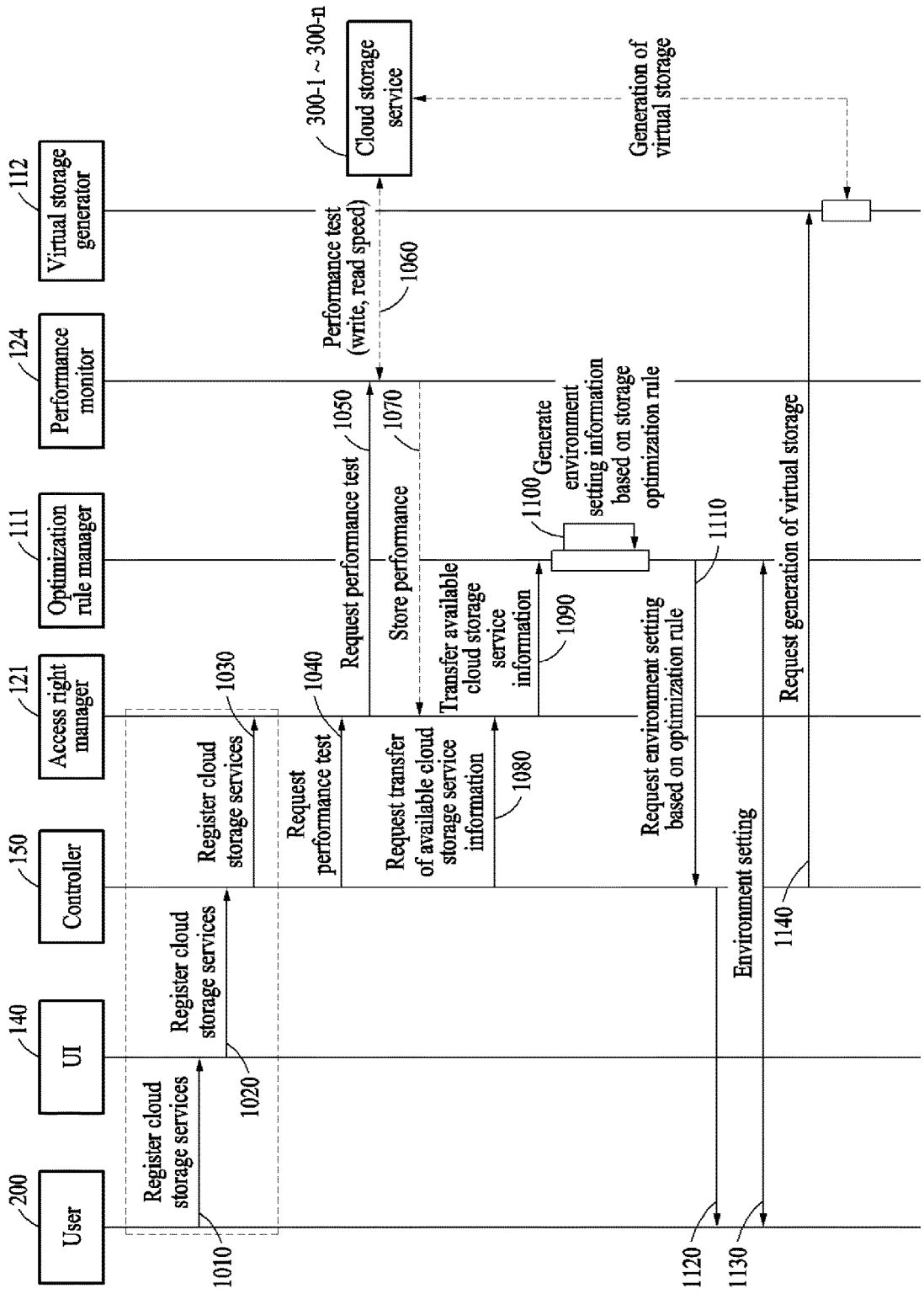
FIG. 4 is a flowchart describing an operation of the cloud storage sharing-based storage optimization system of FIG. 1.

FIG. 4 is a flowchart describing an operation of the cloud storage sharing-based storage optimization system 100 of FIG. 1.

Referring to FIG. 4, in operation 1010, the user 200 may register the plurality of using cloud storage services 300-1 to 300-n to the cloud storage sharing-based storage optimization system 100. Here, the user 200 may use a user interface (UI) 140 of the cloud storage sharing-based storage optimization system 100.

A controller 150 may perform a system control. That is, the controller 150 may overall control the cloud storage sharing-based storage optimization system 100.

In operation 1020, the controller 150 may receive an input of the user 200 through the UI 140.

In operation 1030, the controller 150 may store information associated with the using cloud storage services 300-1 to 300-n in the access right manager 121. Here, the controller 150 may register and store the plurality of cloud storage services 300-1 to 300-n individually one by one or collectively at a time.

In operation 1040, the controller 150 may request the access right manager 121 for a performance test. The controller 150 may verify the performance of the plurality of cloud storage services 300-1 to 300-n.

In operation 1050, the access right manager 121 may request the performance monitor 124 for the performance test in response to the request from the controller 150.

In operation 1060, the performance monitor 124 may perform the performance test on the registered plurality of cloud storage services 300-1 to 300-n. That is, the performance monitor 124 may test a write speed and a read speed.

In operation 1070, the performance monitor 124 may store the performance of the cloud storage services 300-1 to 300-n in the access right manager 121.

Once the registration and the performance test on the cloud storage services 300-1 to 300-n are completed, the controller 150 may request the access right manager 121 to transfer available cloud storage service information in operation 1080.

In operation 1090, the access right manager 121 may transfer available cloud storage service information registered by the user 200 to the optimization rule manager 111.

In operation 1100, the optimization rule manager 111 may combine the received available cloud storage service information and optimization rule and may generate environment setting information for each storage optimization rule. Here, the optimization rule may be stored in the optimization rule storage 1111.

In operation 1110, the optimization rule manager 111 may request the controller 150 for an environment setting based on the optimization rule.

In operation 1120, the controller 150 may request the user 200 for the environment setting based on the optimization rule.

In operation 1130, the user 200 may perform the environment setting through the optimization rule manager 111. For example, the user 200 may determine configuration information associated with the virtual storage 400 based on a use purpose. A configuration of performing, by the user 200, the environment setting will be further described with reference to FIG. 5.

In operation 1140, the controller 150 may transfer the configuration information associated with the environment setting to the virtual storage generator 112.

Accordingly, the virtual storage generator 112 may configure, that is, generate the virtual storage 400 based on the environment setting.

Figure 5:
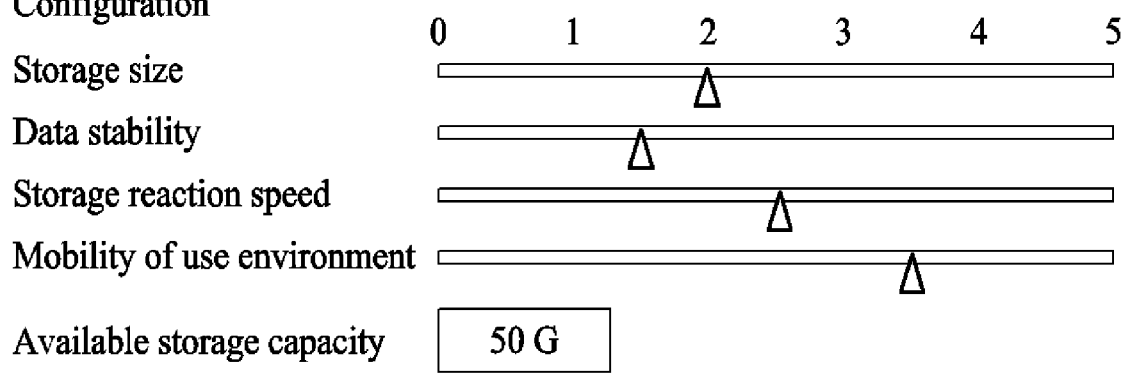
FIG. 5 illustrates an example of an environment setting according to an example embodiment.

FIG. 5 illustrates an example of an environment setting according to an example embodiment.

Referring to FIG. 5, the user 200 may register four cloud storage services to the cloud storage sharing-based storage optimization system 100. Here, a capacity sum of the cloud storage services, that is, a total storage capacity may be 200 G.

The optimization rule manager 111 may generate an initial setting value based on an optimization rule and available cloud storage service information. The optimization rule manager 111 may transfer the initial setting value to the user 200.

The user 200 may complete the environment setting by adjusting a storage size or a storage capacity, a data stability or a storage stability, a storage reaction speed, and a mobility of a use environment such as a location variability of the user 200. Here, each environment setting value may affect values of other items based on the optimization rule. That is, the respective environment setting values may be mutually dependent.

For example, if a storage size value is set as a maximum value, the data stability, the storage reaction speed, and the mobility of the use environment may be set as minimum values. Also, if the data stability and the storage reaction speed are increased, the performance may be enhanced by duplicating data, mirroring the data, and applying storage priority. Here, the combined available storage capacity may be relatively decreased.

The virtual storage generator 112 may generate the single virtual storage 400 based on the environment setting value, for example, configuration information of the virtual storage 400, transferred from the optimization rule manager 111.

When the user 200 uses the single virtual storage 400, the cloud storage sharing-based storage optimization system 100 may perform monitoring with respect to the single virtual storage 400 and an actual cloud storage service. For example, the cloud storage sharing-based storage optimization system 100 may perform monitoring on a data access history using the data access history manager 123. Also, the cloud storage sharing-based storage optimization system 100 may perform performance monitoring using the performance monitor 124. The cloud storage sharing-based storage optimization system 100 may continuously perform the optimization of the virtual storage 400 based on the optimization rule selected by the user 200.

Hereinafter, an operation of performing, by the cloud storage sharing-based storage optimization system 100, optimization based on various situations of the user 200 according to example embodiments will be described with reference to FIGS. 6 through 8.

Figure 6:
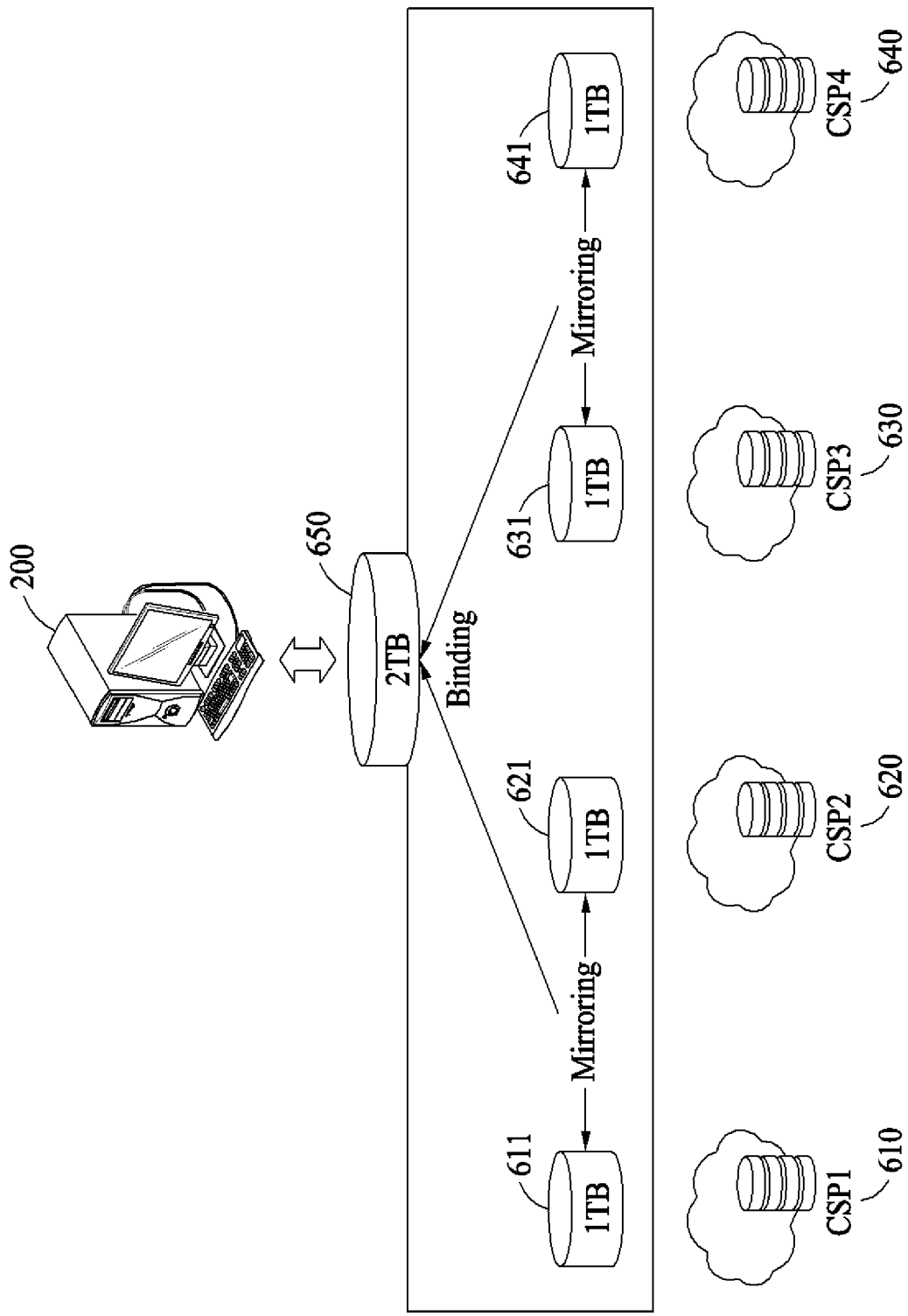
FIG. 6 illustrates an example of describing an optimization of the cloud storage sharing-based storage optimization system of FIG. 1.

FIG. 6 illustrates an example of describing an optimization of the cloud storage sharing-based storage optimization system 100 of FIG. 1.

An optimization example of a single virtual storage 650 to achieve a storage stability or a data stability and a performance enhancement will be described with reference to FIG. 6. Referring to FIG. 6, the user 200 may use cloud storage services 611, 621, 631, and 641, each having capacity of 1 TB, respectively, from four different cloud solution providers (CSPs) 610, 620, 630, and 640.

That is, the cloud storage sharing-based storage optimization system 100 may generate the virtual storage 650 by performing the optimization from the cloud storage services 611, 621, 631, and 641.

Here, although the capacity of the virtual storage 650 is reduced from 4 TB to 2 TB, the storage stability or the data stability may be secured through storage mirroring between the cloud storage services 611, 621, 631, and 641. In addition, a data read speed may be enhanced by requesting data through simultaneous access to the mirrored respective cloud storage services 611, 621, 631, and 641. Here, the storage mirroring may indicate an data mirroring operation of duplicating and thereby storing data. For example, storage mirroring may be performed between first and second cloud services, for example, the cloud storage services 611 and 621, and storage mirroring may be performed between third and fourth cloud storage services, for example, the cloud storage services 631 and 641.

Figure 7:
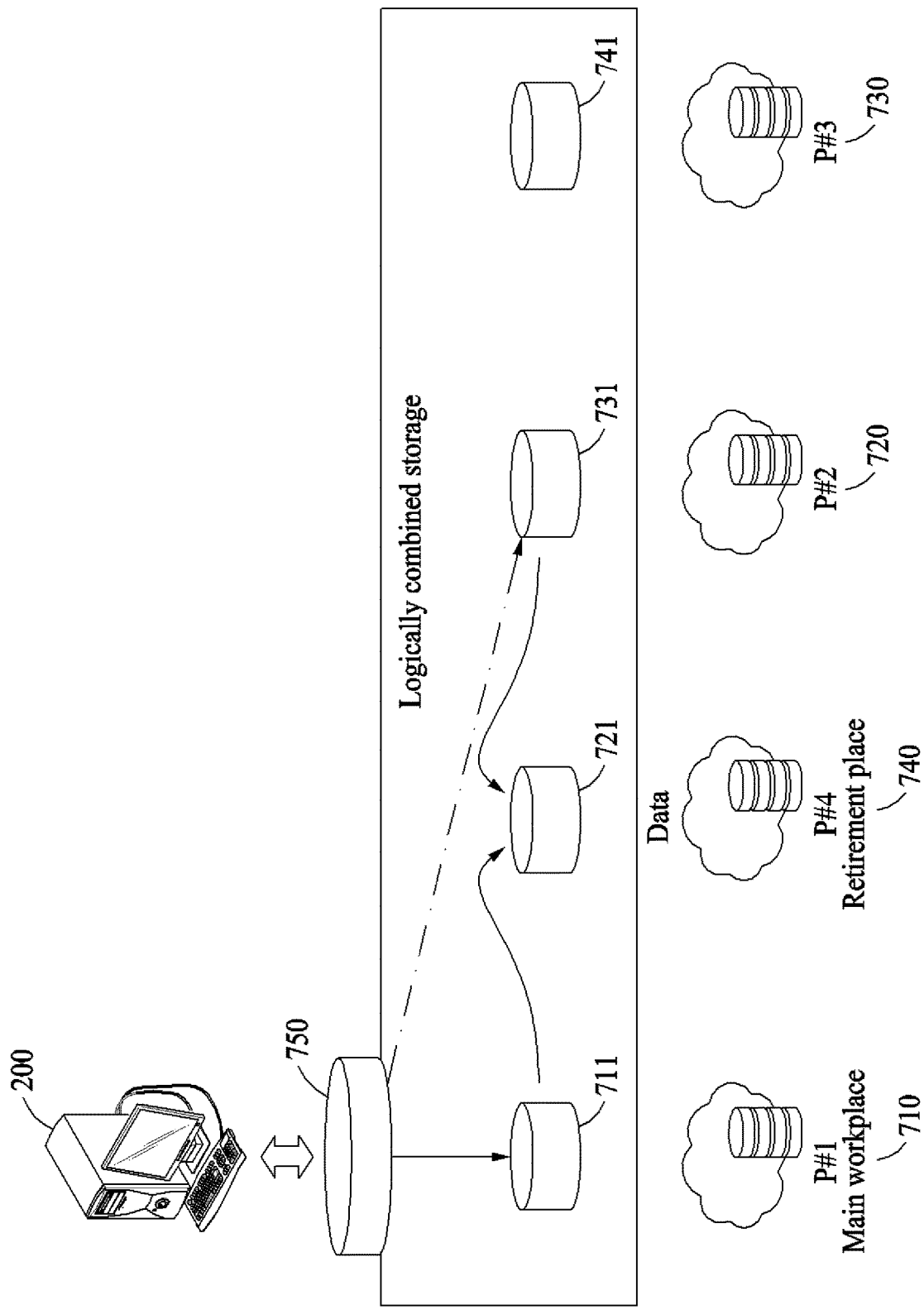
FIG. 7 illustrates another example of describing an optimization of the cloud storage sharing-based storage optimization system of FIG. 1.

FIG. 7 illustrates another example of describing an optimization of the cloud storage sharing-based storage optimization system 100 of FIG. 1.

An optimization example of a single virtual storage 750 to enhance a storage performance will be described with reference to FIG. 7. Referring to FIG. 7, the user 200 may use cloud storage services 711, 721, 731, and 741, each having different capacity and performance, respectively, from different CSPs 710, 720, 730, and 740.

The cloud storage sharing-based storage optimization system 100 may generate the virtual storage 750 by performing the optimization from the cloud storage services 711, 721, 731, and 741.

The cloud storage sharing-based storage optimization system 100 may set the CSP 710 as a main workplace and set the CSP 740 as a retirement place based on a priority. The user 200 may store frequently using data in the CSP 710 corresponding to the main workplace and may store the entire data in the CSP 740 corresponding to the retirement place using the virtual storage 750. That is, the frequently using data may be stored in the cloud storage service 711 and the entire data may be stored in the cloud storage service 741.

The cloud storage sharing-based storage optimization system 100 may process data using the data mobility manager 131. For example, the cloud storage sharing-based storage optimization system 100 may move data between the cloud storage services 711, 721, 731, and 741 or may store, call, or delete data of the cloud storage services 711, 721, 731, and 741.

Here, the cloud storage sharing-based storage optimization system 100 may process data based on a time that is predefined based on an access frequency to an individual piece of data monitored through the data access history manager 123 or a data capacity level of the CSP 710 corresponding to the main workplace.

The user 200 may use the virtual storage 750 of which the performance corresponds to a cloud storage service with the highest performance at all times. That is, the performance efficiency of the combined virtual storage 750 may be enhanced.

Figure 8:
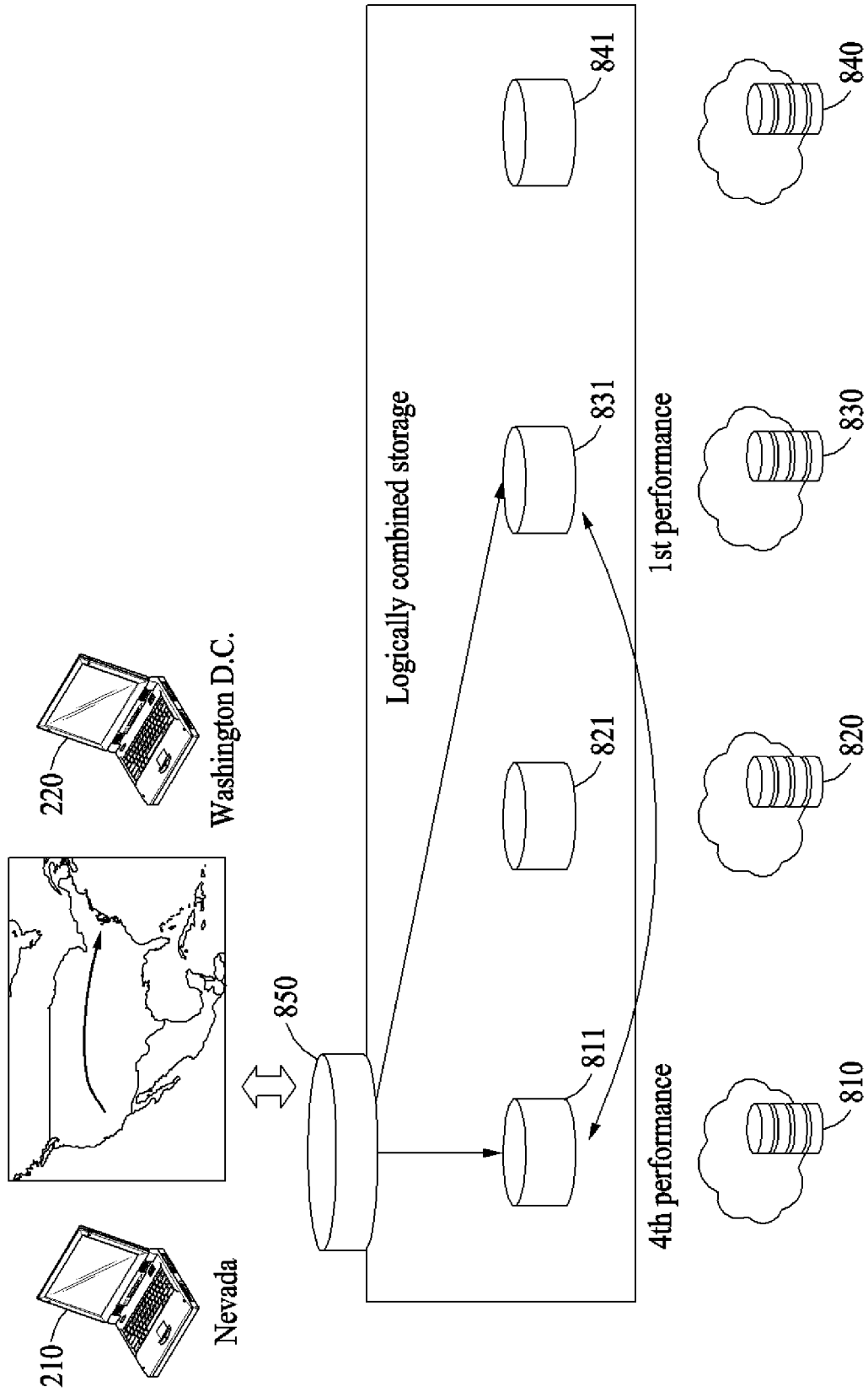
FIG. 8 illustrates another example of describing an optimization of the cloud storage sharing-based storage optimization system of FIG. 1.

FIG. 8 illustrates another example of describing an optimization of the cloud storage sharing-based storage optimization system 100 of FIG. 1.

An optimization example of a single virtual storage 850 according to a location variability of the user 200 or a mobility of a use environment will be described with reference to FIG. 8. Referring to FIG. 8 the user 200 may use cloud storage services 811, 821, 831, and 841, each having different capacity and performance, respectively, from different CSPs 810, 820, 830, and 840.

The user 200 may use a computer 210 in the state of Nevada and may use a computer 220 in Washing, D.C. Here, the computer 210 and the computer 220 may be identical or different. For example, if the computer 210 is identical to the computer 220, the computer 210, 220 may be configured as a portable computer. The user 200 may move while using the computer 210, 220.

The cloud storage sharing-based storage optimization system 100 may generate the virtual storage 850 by performing the optimization from the cloud storage services 811, 821, 831, and 841.

Here, an access speed to each of the cloud storage services 811, 821, 831, and 841 may be different based on a location variability of the user 200 or a mobility of a use environment. The cloud storage sharing-based storage optimization system 100 may preferentially access the cloud storage service 831 that is measured to have the most excellent performance, and may record data. Also, the cloud storage sharing-based storage optimization system 100 may optimize the performance of the virtual storage 850 by duplicating frequently requested data to the cloud storage service 811 having the most excellent performance based on a data access history during monitoring.

Through the aforementioned procedures, the cloud storage sharing-based storage optimization system 100 may generate the single virtual storage 850, may perform monitoring, and may use the virtual storage 850 for optimization depending on situations. That is, the user 200 may use the combined virtual storage 850 in a form optimized for a system purpose of the user 200 and thus, may save storage cost.

Figure 9:
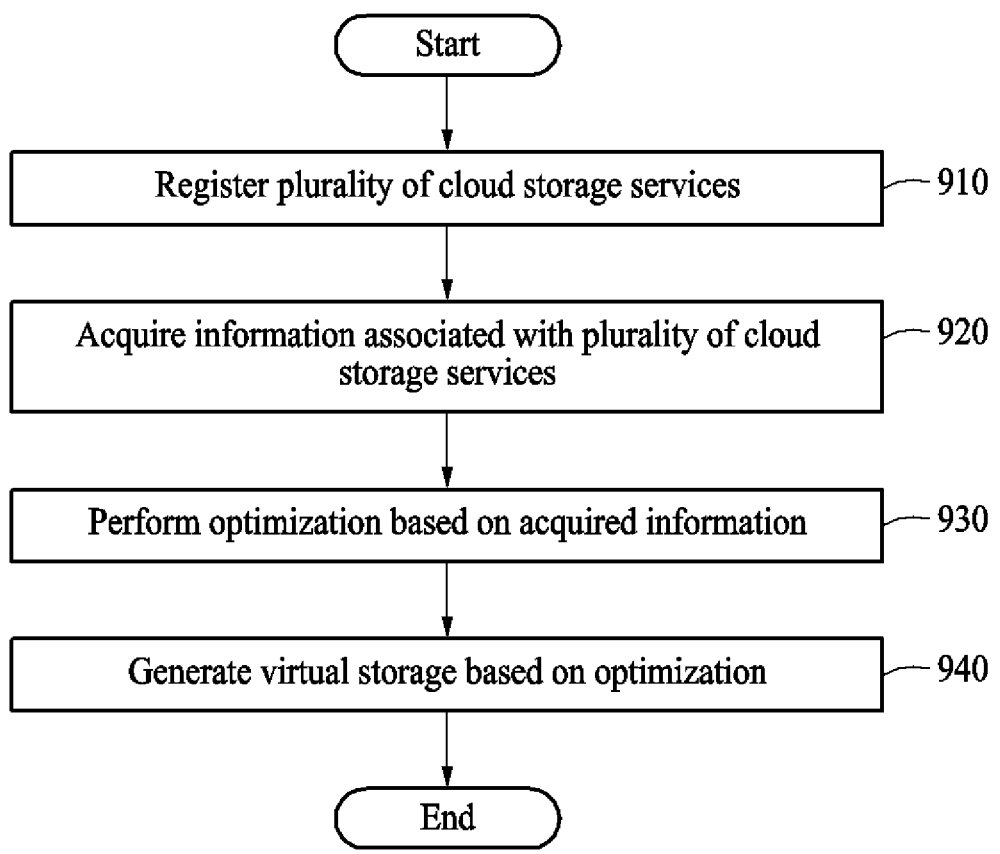
FIG. 9 is a flowchart illustrating an optimization method according to an example embodiment.

FIG. 9 is a flowchart illustrating an optimization method according to an example embodiment.

Referring to FIG. 9, in operation 910, the cloud storage sharing-based storage optimization system 100 may register a plurality of cloud storage services. The plurality of cloud storage services may have the same or different performance in terms of, for example, a size, a speed, and the like.

In operation 920, the cloud storage sharing-based storage optimization system 100 may acquire information associated with the plurality of cloud storage services. Here, the cloud storage sharing-based storage optimization system 100 may acquire information by performing a performance test with respect to the plurality of cloud storage services. The information may include a data write speed and a data read speed of each of the plurality of cloud storage services.

In operation 930, the cloud storage sharing-based storage optimization system 100 may perform optimization based on the acquired information. Here, the cloud storage sharing-based storage optimization system 100 may perform the optimization in response to an optimization rule selected by the user 200. For example, the optimization rule may include a plurality of environment setting values being mutually dependent. The environment setting value may include at least one of a storage size, a data stability, a storage reaction speed, and a mobility of a use environment.

In operation 940, the cloud storage sharing-based storage optimization system 100 may generate a virtual storage based on the optimization. That is, the cloud storage sharing-based storage optimization system 100 may combine the plurality of cloud storage services based on the optimization.

The components described in the example embodiments may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

The example embodiments described herein may be implemented using hardware components, software components, and/or combination thereof. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include plurality of processing elements and plurality of types of processing elements. For example, a processing device may include plurality of processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The components described in the example embodiments may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optimization method comprising:
   registering a plurality of cloud storage services from different cloud service providers;
   acquiring performance information associated with each of the plurality of cloud storage services;
   performing optimization based on the acquired performance information and an optimization rule based on a plurality of environment setting values; and
   generating a virtual storage that combines the plurality of cloud storage services into a unified virtual storage through the optimization,
   wherein the acquired performance information comprises a data write speed and a data read speed of each of the plurality of cloud storage services,
   wherein the plurality of environment setting values comprise a storage size, a data stability, a storage reaction speed, and a mobility of a use environment, and
   wherein performing optimization comprises preferentially accessing cloud storage services measured to have a most excellent performance based on a mobility of use environment.

2. The optimization method of claim 1, wherein the plurality of environment setting values are selected by a user.

3. The optimization method of claim 2, wherein the plurality of environment setting values are mutually dependent.

4. The optimization method of claim 1, wherein the acquiring comprises acquiring the performance information by performing a performance test on the plurality of cloud storage services.

5. The optimization method of claim 1, wherein the generating of the virtual storage comprises generating the virtual storage based on at least one of user's access geo-location, storage mirroring, storage stripping, and storage prioritization between the plurality of cloud storage services.

6. An optimization apparatus comprising:
   a processor configured to:
   register a plurality of cloud storage services from different cloud service providers;
   acquire performance information associated with each of the plurality of cloud storage services;
   perform optimization based on the acquired performance information and an optimization rule based on a plurality of environment setting values; and
   generate a virtual storage that combines the plurality of cloud storage services through the optimization,
   wherein the acquired performance information comprises a data write speed and a data read speed of each of the plurality of cloud storage services,
   wherein the plurality of environment setting values comprises a storage size, a data stability, a storage reaction speed, and a mobility of use environment,
   wherein the processor is configured to preferentially access the cloud storage services measured to have a most excellent performance based on a mobility of use environment.

7. The optimization apparatus of claim 6, wherein the optimization rule and the plurality of environment setting values are selected by a user.

8. The optimization apparatus of claim 7, wherein the plurality of environment setting values are mutually dependent.

9. The optimization apparatus of claim 6, wherein the processor is further configured to acquire the performance information by performing a performance test on the plurality of cloud storage services.

10. The optimization apparatus of claim 6, wherein the processor is further configured to generate the virtual storage based on at least one of user's access geo-location, storage mirroring, storage stripping, and storage prioritization between the plurality of cloud storage services.

* * * * *